(12) United States Patent
May et al.

(10) Patent No.: US 8,525,545 B1
(45) Date of Patent: Sep. 3, 2013

(54) POWER ISOLATION DURING SENSITIVE OPERATIONS

(75) Inventors: David May, The Villages, FL (US); Burton Wolfe, Ocoee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/595,512

(22) Filed: Aug. 27, 2012

Related U.S. Application Data (60) Provisional application No. 61/573,074, filed on Aug. 26, 2011.

(51) Int. Cl.
*H03K 19/00* (2006.01)

(52) U.S. Cl.
USPC ..................... 326/8; 326/9; 326/38

(58) Field of Classification Search
None
See application file for complete search history.

(56) References Cited

U.S. PATENT DOCUMENTS

| | | | |
|---|---|---|---|
| 6,419,159 B1 | 7/2002 | Odinak | |
| 6,654,884 B2 | 11/2003 | Jaffe et al. | |
| 6,873,706 B1 | 3/2005 | Miyazaki et al. | |
| 7,368,935 B2 * | 5/2008 | Bernier et al. | ............... 326/8 |
| 7,386,130 B2 | 6/2008 | Ito et al. | |
| 7,426,629 B2 | 9/2008 | Piry et al. | |
| 7,599,491 B2 | 10/2009 | Lambert | |
| 7,620,823 B2 | 11/2009 | Kim | |
| 7,848,514 B2 | 12/2010 | Gebotys | |
| 7,885,408 B2 | 2/2011 | Teglia et al. | |
| 7,899,190 B2 | 3/2011 | Gebotys | |
| 7,907,722 B2 | 3/2011 | Timmermans | |
| 7,920,050 B2 | 4/2011 | Juels et al. | |
| 7,965,836 B2 | 6/2011 | Ahn et al. | |
| 2001/0053220 A1 | 12/2001 | Kocher et al. | |
| 2004/0025032 A1 | 2/2004 | Chow et al. | |
| 2004/0030905 A1 | 2/2004 | Chow et al. | |
| 2004/0078588 A1 | 4/2004 | Chow et al. | |
| 2004/0223481 A1 | 11/2004 | Juels et al. | |
| 2005/0271202 A1 | 12/2005 | Shu et al. | |
| 2011/0019819 A1 | 1/2011 | Bernstein et al. | |
| 2012/0274351 A1 * | 11/2012 | Pedersen et al. | ............... 326/8 |

FOREIGN PATENT DOCUMENTS

| | | |
|---|---|---|
| DE | 102004032894 A1 | 2/2006 |
| FR | 2923305 A1 | 5/2009 |
| GB | 2443358 A | 4/2008 |
| JP | 2000066585 A | 3/2000 |

(Continued)

OTHER PUBLICATIONS

XILINX, "Virtex-II Platform FPGAs: Introduction and Overview," Product Specification, DS031-1 (v3.5), Nov. 5, 2007, 7 pages.

(Continued)

*Primary Examiner* — Anh Tran (74) *Attorney, Agent, or Firm* — Withrow & Terranova, PLLC

(57) ABSTRACT

Power isolation during sensitive operations is disclosed. In one embodiment, a programmable chip package includes a programmable chip configured to perform a sensitive operation, and a switch configured to selectively couple a main power source to the programmable chip. The programmable chip package may also include an alternate power source and a controller that is configured to control the switch to decouple the main power source from the programmable chip prior to the sensitive operation, wherein the programmable chip is configured to draw power from the alternate power source during the sensitive operation. The controller is further configured to control the switch to couple the main power source to the programmable chip after the sensitive operation.

21 Claims, 11 Drawing Sheets

(56) References Cited

FOREIGN PATENT DOCUMENTS

| | | |
|---|---|---|
| KR | 20100011264 A | 2/2010 |
| WO | 03019357 A1 | 3/2003 |
| WO | 2008019246 A2 | 2/2008 |
| WO | 2011061263 A1 | 5/2011 |

OTHER PUBLICATIONS

Dworkin, M. "Recommendation for block cipher modes of operation: methods for key wrapping," NIST Special Publication 800-38F, Aug. 2011, 31 pages.

Krieg, A et al., "A side channel attack countermeasure using system-on-chip power profile scrambling," 2011 IEEE 17th International On-Line Testing Symposium, Jul. 2011, pp. 222-227.

Unknown Author, "Annex F: Non-invasive attack methods for FIPS," PUB 140-3, Security Requirements for Cryptographic Modules, Sep. 10, 2009, 7 pages.

Popp, T. et al., "Power analysis attacks and countermeasures," IEEE Design and Test of Computers, 2007, pp. 535-543.

Mahmoud, H. et al, "Novel algorithmic countermeasures for differential power analysis attacks on smart cards," 2010 6th International Conference on Information Assurance and Security, 2010, pp. 52-55.

Jackson, W., "New crypto standard to require protection against power analysis," Government Computer News, Dec. 11, 2009, 3 pages.

Moradi, A. et al., "On the Vulnerability of FPGA bitstream encryption against power analysis attacks: Extracting Keys from Xilinx Virtex-II FPGAs," Jul. 2011, 11 pages.

Cryptography Research, "Licensed countermeasures," published at least as early as Oct. 10, 2012, 2 pages.

Non-Final Office Action for U.S. Appl. No. 13/677,824, mailed Mar. 26, 2013, 5 pages.

* cited by examiner

Power Isolation During Sensitive Operations

POWER ISOLATION DURING SENSITIVE OPERATIONS

RELATED APPLICATIONS

This application claims the benefit of and priority to provisional patent application Ser. No. 61/573,074, filed Aug. 26, 2011, the disclosure of which is hereby incorporated herein by reference in its entirety.

TECHNICAL FIELD

The embodiments disclosed herein relate to eliminating the power signature of a programmable chip during a sensitive operation.

BACKGROUND

Programmable chips, such as field-programmable gate arrays (FPGAs), are widely used in various applications due to their relative speed and flexibility. Unfortunately, techniques, such as differential power analysis (DPA), have been developed for monitoring variations in an FPGA's power consumption which facilitates reverse engineering of the FPGA.

In one example, an FPGA may initialize from a boot read-only memory (ROM) which contains data that configures the FPGA to perform a desired function. The data on the boot ROM may be encrypted to prevent reverse engineering of the data. The FPGA, during initialization, reads the encrypted data from the boot ROM, decrypts the data, and loads the decrypted data. Unfortunately, the above-mentioned DPA techniques have enabled individuals to extract cryptographic keys during the FPGA decryption process, making encryption at best vulnerable, and at worst ineffective.

SUMMARY

The embodiments relate to power isolation during sensitive operations. In one embodiment, a programmable chip package includes a programmable chip that is configured to perform a sensitive operation. The programmable chip package also includes an alternate power source and a switch configured to selectively couple a main power source to the programmable chip. A controller is configured to control the switch to decouple the main power source from the programmable chip prior to the sensitive operation, wherein the programmable chip is configured to draw power from the alternate power source during the sensitive operation. The controller is also configured to control the switch to couple the main power source to the programmable chip after the sensitive operation.

In another embodiment, an electronic circuit includes at least one switch that is configured to selectively couple a main power source or an alternate power source to a programmable chip. The electronic circuit also includes a controller that is communicatively coupled to the at least one switch. The controller is configured to control the switch to decouple the main power source from the programmable chip prior to a sensitive operation by the programmable chip and to couple the alternate power source to the programmable chip during the sensitive operation. The controller is also configured to control the switch to couple the main power source to the programmable chip subsequent to the sensitive operation.

In another embodiment, a method for eliminating a power signature is provided. The method includes providing power through a switch from a main power source to a programmable chip configured to perform a sensitive operation. The method further includes controlling the switch to decouple the main power source from the programmable chip prior to the sensitive operation, wherein the programmable chip is configured to draw power from an alternate power source during the sensitive operation. The method also includes controlling the switch to couple the main power source to the programmable chip after the sensitive operation.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
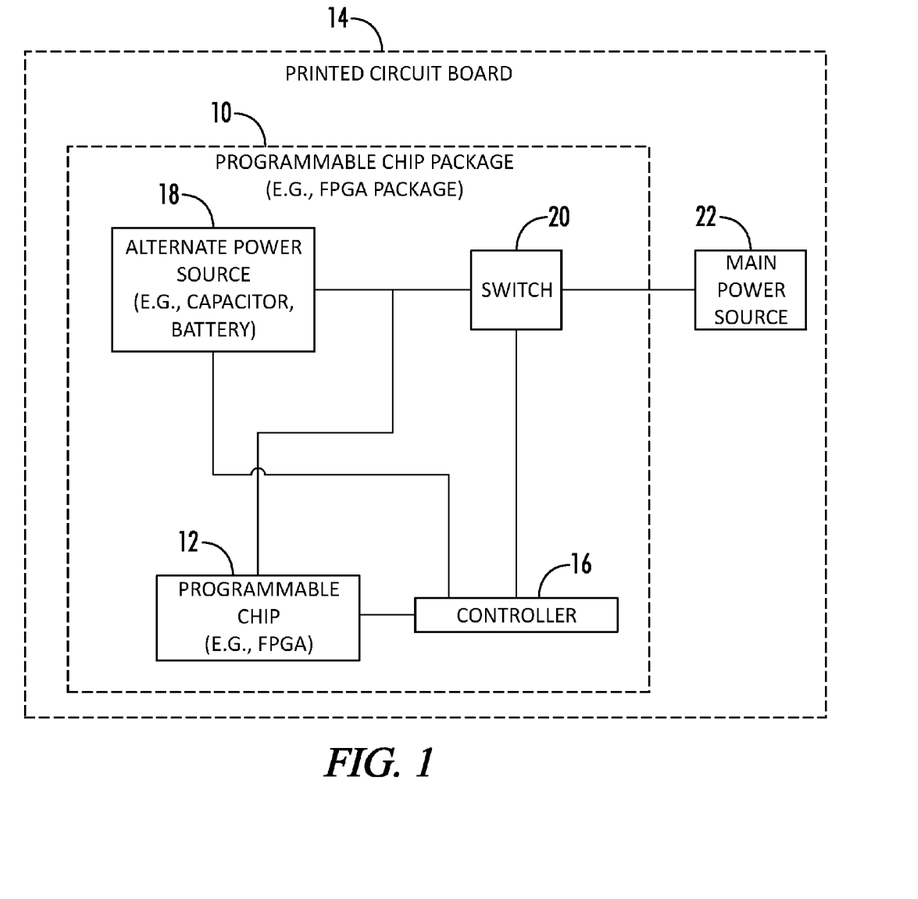
FIG. 1 is a block diagram illustrating an example programmable chip package according to one embodiment.

FIG. 1 is a block diagram of an example programmable chip package 10 according to one embodiment. The programmable chip package 10 includes a programmable chip 12, which may comprise, for example, a field-programmable gate array (FPGA), or other type of programmable chip. The programmable chip package 10 may also include pins, balls, or other electrical contacts (not illustrated) for facilitating communication with electronic components that are external to the programmable chip package 10 and that may be mounted along with the programmable chip package 10 on, for example, a printed circuit board 14. In the embodiment illustrated in FIG. 1, the programmable chip package 10 may include one or more other electronic components, such as a controller 16 for facilitating functionality described below. However, it should be noted that while the controller 16 is illustrated herein as a component separate from the programmable chip 12 for ease of illustration, functionality attributed to the controller 16 may be in part, or in whole, implemented in the programmable chip 12 itself. It should also be noted that, in practice, the printed circuit board 14 would likely have a number of other electrical components mounted with respect to the printed circuit board 14 depending on the particular functionality implemented by the printed circuit board 14, which are not illustrated herein for ease of illustration.

The programmable chip package 10 may also include an alternate power source 18, which, as described in greater detail herein, may be used to provide power, such as electrical power, to the programmable chip 12 during one or more periods of time. The alternate power source 18 may comprise, for example, a battery, a rechargeable battery, a capacitor, an inductor, or any other component capable of providing power to the programmable chip 12 for a period of time. The programmable chip package 10 may also include a switch 20 that is capable of selectively coupling a main power source 22 to the programmable chip 12. The switch 20 may selectively couple the main power source 22 to the programmable chip 12 under control of the controller 16. The switch 20 may comprise, for example, one or more metal oxide semiconductor field-effect transistor (MOSFET) switches, or any other suitable switch or switches capable of being controlled to selectively couple the programmable chip 12 to the main power source 22. The main power source 22 may be mounted with respect to the printed circuit board 14, or may be external to the printed circuit board 14.

Assume that the programmable chip 12, during one or more periods of operation, engages in a sensitive operation. According to one embodiment, during such one or more periods of sensitive operation, the programmable chip 12 is decoupled from the main power source 22 and draws power from the alternate power source 18, thereby isolating the programmable chip 12 and eliminating any variations in power of the programmable chip 12 during such sensitive operations from appearing on the electrical contacts or interfaces of the printed circuit board 14. A sensitive operation may comprise any operation deemed to be sensitive and during which it is desirable to isolate the power signature of the programmable chip 12 from that of the main power source 22. Examples of sensitive operations include decryption operations wherein encrypted data is being decrypted, or any other operations wherein reverse engineering of such operations by a third-party would be undesirable.

Figure 2:
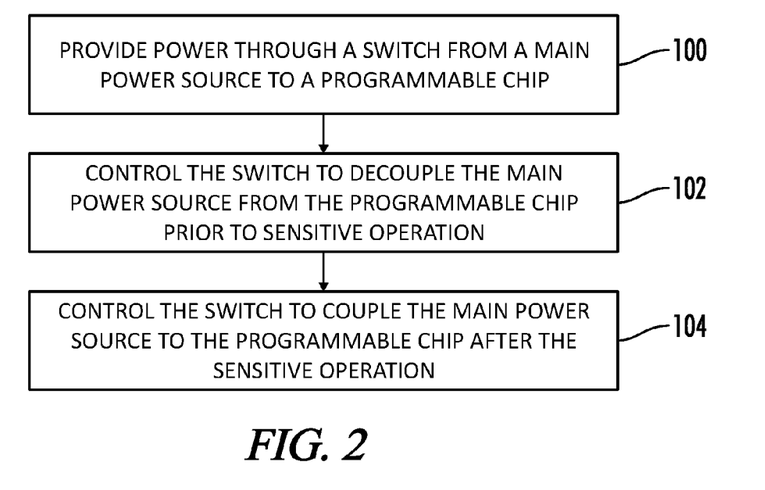
FIG. 2 is a flowchart illustrating an example process for power isolation during a sensitive operation according to one embodiment.

FIG. 2 is a flowchart illustrating an example process for power isolation during a sensitive operation according to one embodiment, and will be discussed in conjunction with FIG. 1. Initially, the programmable chip 12 is provided power through the switch 20 from the main power source 22 (FIG. 2, block 100). Assume that the programmable chip 12 is preparing to perform a sensitive operation. The controller 16 controls the switch 20 to decouple the main power source 22 from the programmable chip 12 prior to the sensitive operation (FIG. 2, block 102). The programmable chip 12 is configured to draw power from the alternate power source 18 during the sensitive operation. After completion of the sensitive operation, the controller 16 controls the switch 20 to couple the main power source to the programmable chip 12 (FIG. 2, block 104).

In one embodiment, the alternate power source 18 may be incapable of providing suitable power, such as a voltage, to the programmable chip 12 for a period of time sufficient to complete the sensitive operation. For example, the alternate power source 18 may comprise a capacitor, or a rechargeable battery with limited power output characteristics.

Figure 3:
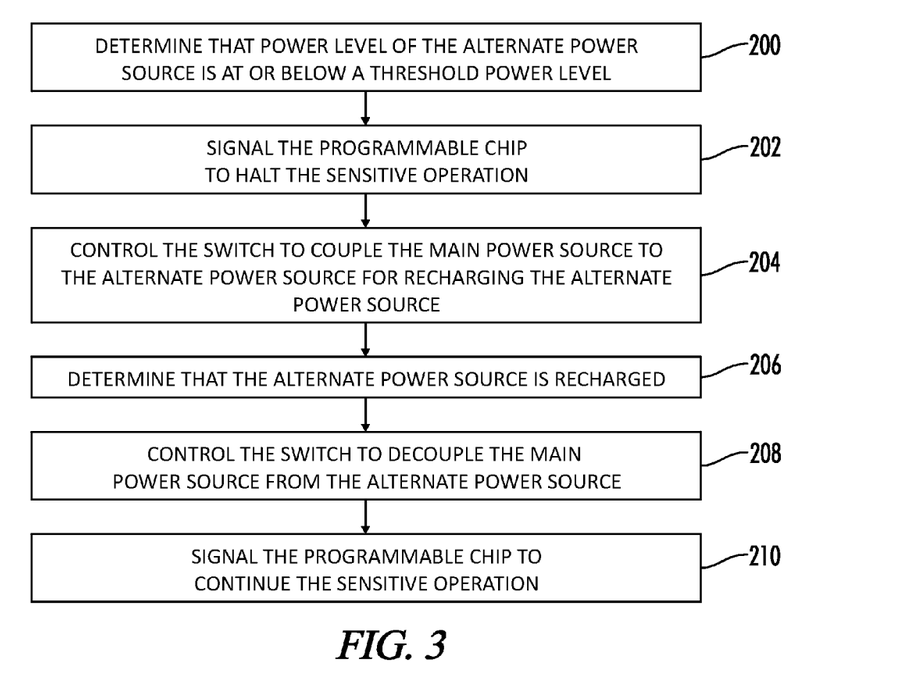
FIG. 3 is flowchart illustrating an example process for power isolation that may be used in conjunction with the process described in FIG. 2, wherein the programmable chip may be interrupted during the sensitive operation to recharge the alternate power source.

FIG. 3 is flowchart illustrating an example process for power isolation that may be used in conjunction with the process described in FIG. 2, wherein the programmable chip 12 may be interrupted during a sensitive operation to recharge the alternate power source 18. FIG. 3 will be discussed in conjunction with FIG. 1.

Assume that the controller 16 is able to monitor the power level of the alternate power source 18 during the sensitive operation that is being performed by the programmable chip 12. The controller 16 determines that the power level of the alternate power source 18 is at or below a threshold power level (FIG. 3, block 200). The controller 16 signals the programmable chip 12 to halt the sensitive operation (FIG. 3, block 202). The controller 16 controls the switch 20 to couple the main power source 22 to the alternate power source 18 for recharging the alternate power source 18 (FIG. 3, block 204). The controller 16 continues to monitor the power level of the alternate power source 18 and ultimately determines that the alternate power source 18 is recharged (FIG. 3, block 206). The controller 16 controls the switch 20 to decouple the main power source 22 from the alternate power source 18 (FIG. 3, block 208). A controller 16 signals the programmable chip 12 to continue the sensitive operation (FIG. 3, block 210). The process described with respect to FIG. 3 may be performed repeatedly until the programmable chip 12 completes the sensitive operation.

Figure 4:
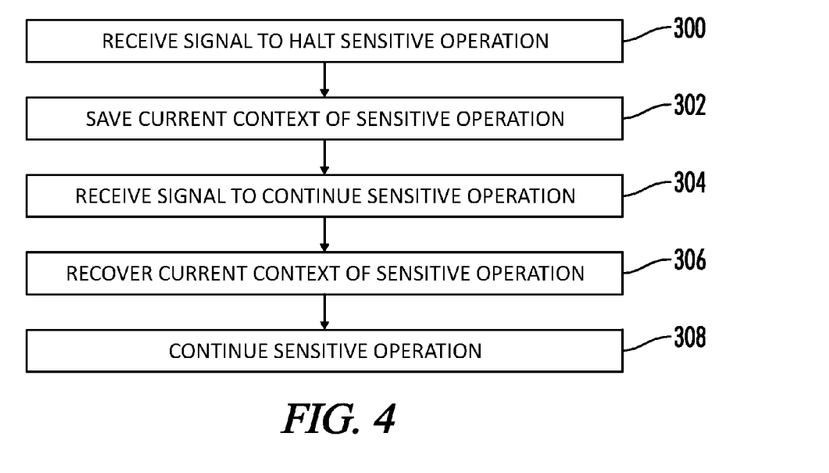
FIG. 4 is a flowchart illustrating an example process that may be performed by the programmable chip in parallel with the process illustrated in FIG. 3 to facilitate performing the sensitive operation.

FIG. 4 is a flowchart illustrating an example process that may be performed by the programmable chip 12 in parallel with the process illustrated in FIG. 3 to facilitate performing the sensitive operation. FIG. 4 will be discussed in conjunction with FIG. 1. The programmable chip 12 receives the signal from the controller 16 to halt the sensitive operation (FIG. 4, block 300). In response, the programmable chip 12 saves a current context of the sensitive operation (FIG. 4, block 302). The current context may include, for example, the values of various registers, variables, and/or any other information suitable to facilitate restarting the sensitive operation after the alternate power source 18 is recharged. The current context may be saved, for example, in a memory coupled to or integrated with the programmable chip 12 (not illustrated). After the alternate power source is recharged, the programmable chip 12 receives the signal from the controller 16 to continue the sensitive operation (FIG. 4, block 304). The programmable chip 12 recovers the current context of the sensitive operation, for example, by reading the previously saved current context from the memory (FIG. 4, block 306). The programmable chip 12 then continues the sensitive operation (FIG. 4, block 308).

Figure 5:
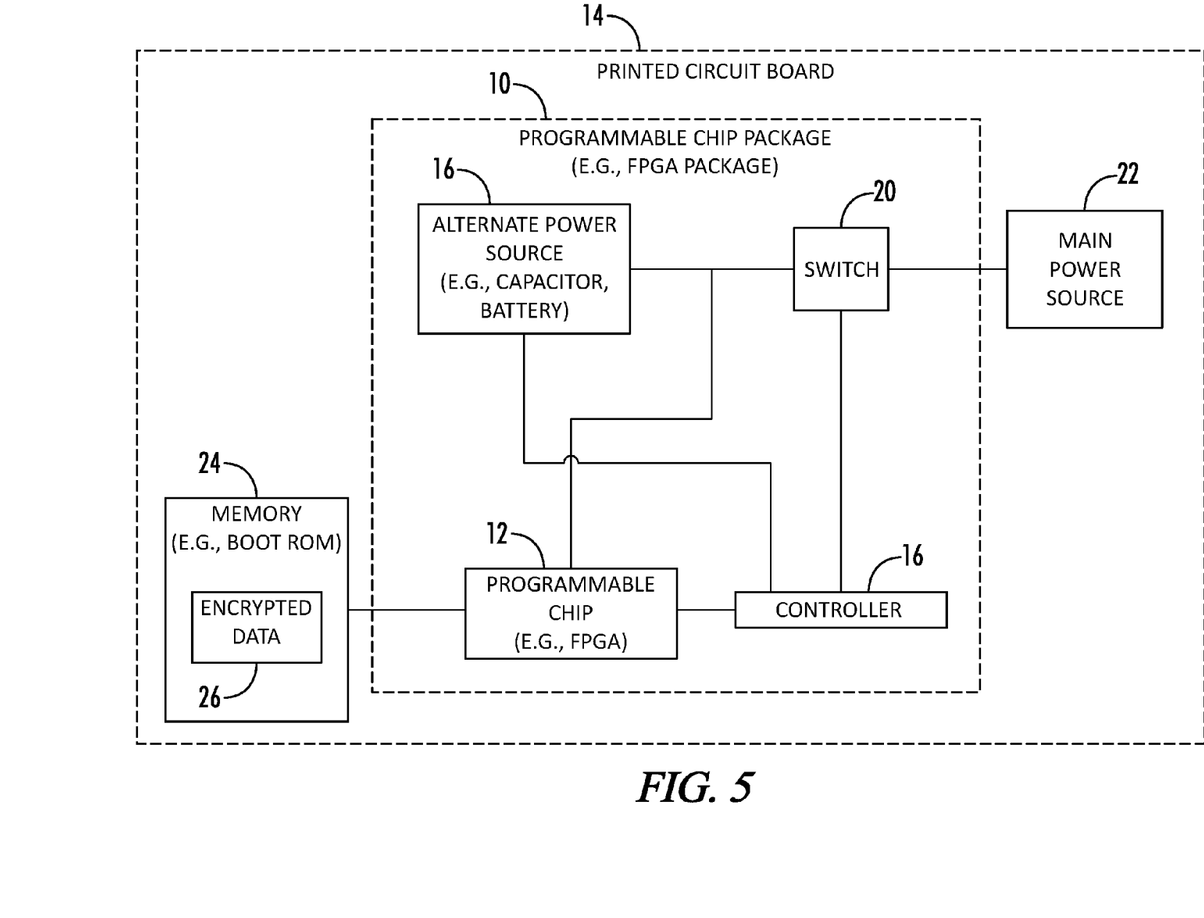
FIG. 5 is a block diagram illustrating an embodiment wherein the sensitive operation performed by the programmable chip is a decryption operation.

FIG. 5 is a block diagram illustrating an embodiment wherein the sensitive operation performed by the programmable chip 12 is a decryption operation. In this embodiment, the programmable chip 12 may be coupled to an external memory 24, such as, by way of non-limiting example, a boot read-only memory (ROM). The memory 24 contains encrypted data 26 which may comprise, for example, instructions for the programmable chip 12.

Figure 6:
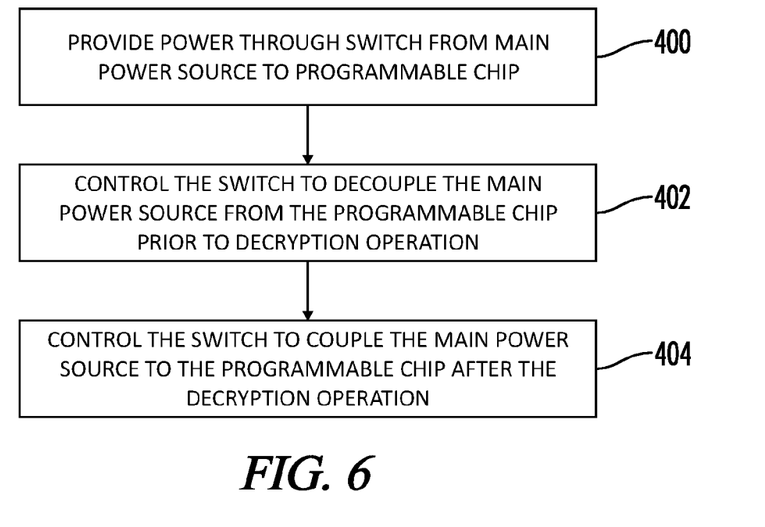
FIG. 6 is a flowchart illustrating an example process for power isolation during a decryption operation according to one embodiment.

FIG. 6 is a flowchart illustrating an example process for power isolation during a decryption operation according to one embodiment, and will be discussed in conjunction with FIG. 5. Assume that a power on or reset of the programmable chip 12 occurs. Initially, the programmable chip 12 is provided power though the switch 20 from the main power source 22 (FIG. 6, block 400).

In one embodiment, the programmable chip 12 and the controller 16 may initialize in a default sensitive operation state that indicates to the programmable chip 12 and the controller 16 that the power on or reset has occurred. The default sensitive operation state may indicate to the programmable chip 12 that the programmable chip 12 should wait until the receipt of a signal from the controller 16 before proceeding.

The controller 16 determines if a power level of the alternate power source 18, such as a voltage level, is at a threshold power level, such as a threshold voltage level, or a threshold current level. In one embodiment, upon power on or reset, the main power source 22 is electrically coupled to the alternate power source 18 and begins to charge the alternate power source 18. Once the alternate power source 18 is at the threshold power level, the controller 16 controls the switch 20 to decouple the main power source 22 from the programmable chip 12 (FIG. 6, block 402). The controller 16 may also signal the programmable chip 12 to begin the sensitive operation. The programmable chip 12 draws power from the alternate power source 18 and reads the encrypted data 26 from the memory 24. The programmable chip 12 decrypts the encrypted data 26, and loads the decrypted data. In one embodiment, the decrypted data may comprise instructions and other data that program the programmable chip 12 to perform a desired function. After the decryption operation completes, the controller 16 controls the switch 20 to couple the main power source 22 to the programmable chip 12 (FIG. 6, block 404). While for purposes of illustration the decryption process has been described herein as being associated with a power on or reset of the programmable chip 12, the embodiments are not limited to any particular decryption processing.

Figure 7:
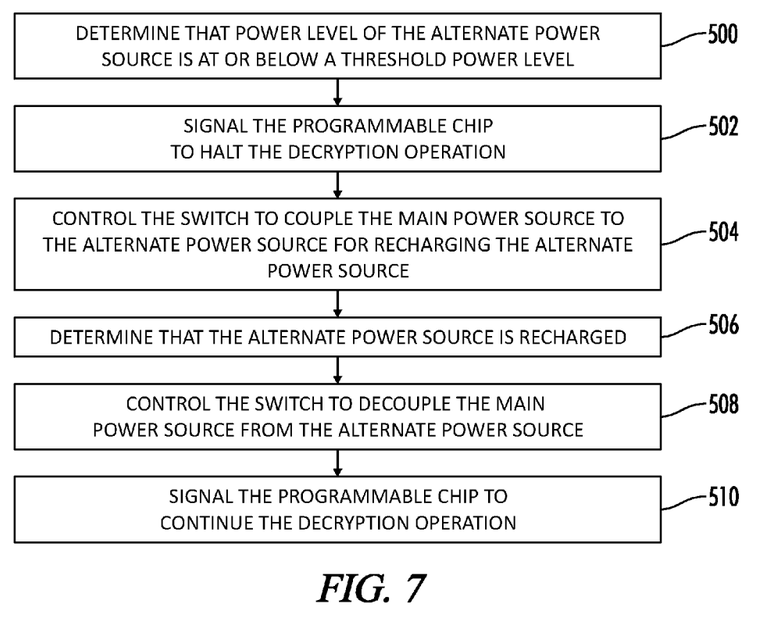
FIG. 7 is flowchart illustrating an example process for power isolation that may be used in conjunction with the process described in FIG. 6, wherein the programmable chip may be interrupted during the decryption operation to recharge the alternate power source.

FIG. 7 is flowchart illustrating an example process for power isolation that may be used in conjunction with the process described in FIG. 6, wherein the programmable chip 12 may be interrupted during the decryption operation to recharge the alternate power source 18. FIG. 7 will be discussed in conjunction with FIG. 5. Assume that the controller 16 is able to monitor the power level of the alternate power source 18 during the decryption operation that is being performed by the programmable chip 12. The controller 16 determines that the power level of the alternate power source 18 is at or below a threshold power level (FIG. 7, block 500). The controller 16 signals the programmable chip 12 to halt the decryption operation (FIG. 7, block 502). The controller 16 controls the switch 20 to couple the main power source 22 to the alternate power source 18 for recharging the alternate power source 18 (FIG. 7, block 504). The controller 16 continues to monitor the power level of the alternate power source 18 and ultimately determines that the alternate power source 18 is recharged (FIG. 7, block 506). The controller 16 controls the switch 20 to decouple the main power source 22 from the alternate power source 18 (FIG. 7, block 508). A controller 16 signals the programmable chip 12 to continue the decryption operation (FIG. 7, block 510). The process described with respect to FIG. 7 may be performed repeatedly until the programmable chip 12 completes the decryption operation.

Figure 8:
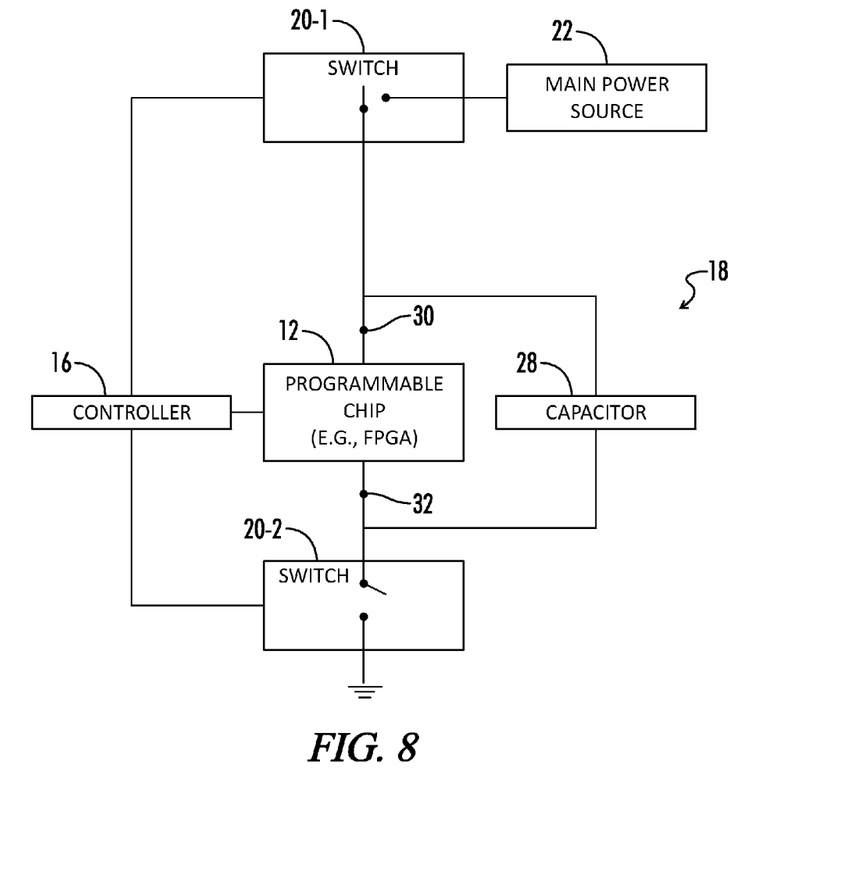
FIG. 8 is a block diagram illustrating an alternate power source according to one embodiment.

FIG. 8 is a block diagram illustrating an alternate power source 18 according to one embodiment. In this embodiment, the alternate power source 18 comprises a capacitor 28. The controller 16 may measure the power level of the capacitor 28 by measuring the voltage drop between points 30 and 32, for example. Initially, to charge the capacitor 28, the controller 16 may control the switches 20-1 and 20-2 to close the switches 20-1 and 20-2 and thereby couple the main power source 22 to the programmable chip 12 and to the capacitor 28. The programmable chip 12 may be in a halt state awaiting a signal from the controller 16 to begin, or continue, the sensitive operation. Over a period of time, the capacitor 28 charges. The precise period of time it takes to charge may differ depending on a number of factors, such as the power supplied to the capacitor 28 by the main power source 22, the capacitance of the capacitor 28, parasitics associated with other electronic circuitry in the electrical path, and the like. Once charged, the controller 16 may control the switches 20-1 and 20-2 to open the switches 20-1 and 20-2 and thereby decouple the main power source 22 from the programmable chip 12 and the capacitor 28. The controller 16 may also signal the programmable chip 12 to begin, or continue, the sensitive operation, by drawing power from the capacitor 28.

Figure 9:
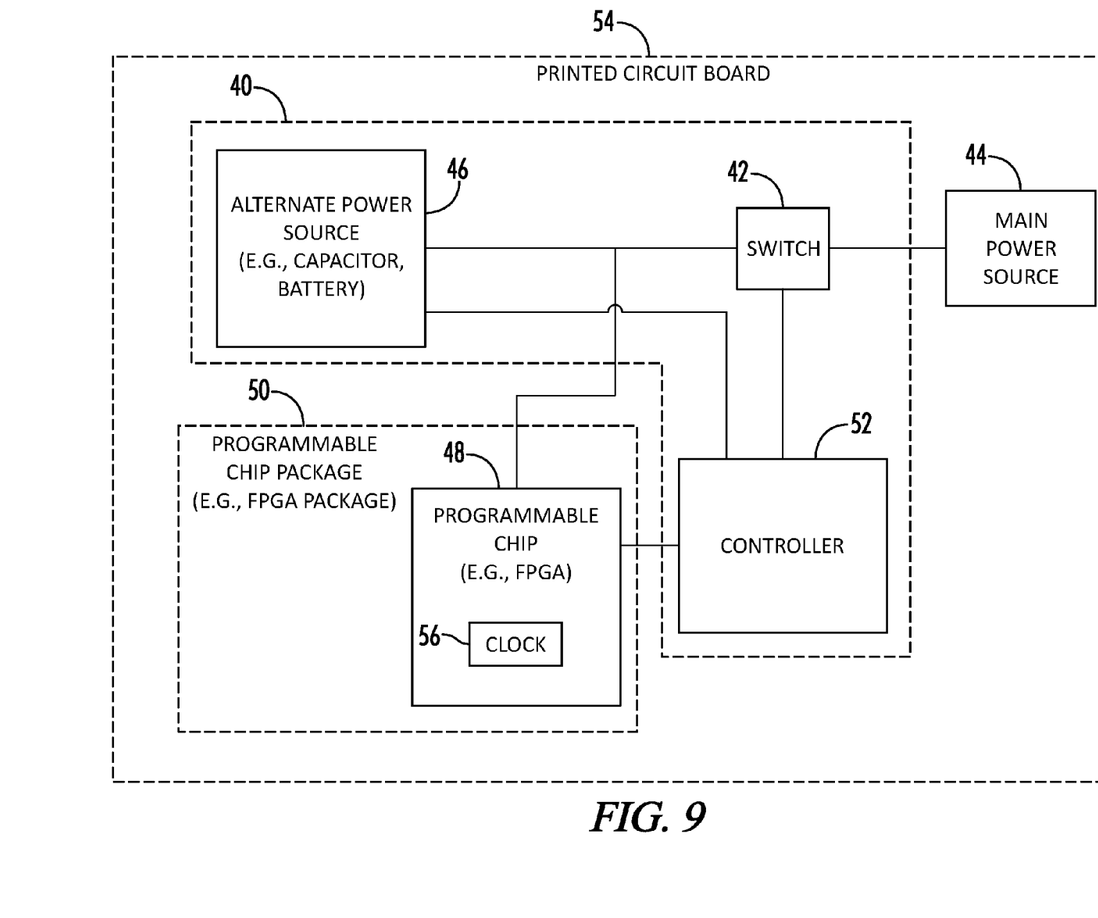
FIG. 9 is a block diagram illustrating another embodiment wherein an electronic circuit decouples a programmable chip from a main power source during a sensitive operation.

FIG. 9 is a block diagram illustrating another embodiment wherein an electronic circuit decouples a programmable chip from a main power source during a sensitive operation. In this embodiment, an electronic circuit 40 includes at least one switch 42 that is configured to selectively couple a main power source 44 or an alternate power source 46 to a programmable chip 48. The programmable chip 48 may comprise, for example, an FPGA and be packaged within a programmable chip package 50, such as an FPGA package. The alternate power source 46 may comprise, for example, a battery, a rechargeable battery, a capacitor, or any other component capable of providing power to the programmable chip 48 for a period of time. The electronic circuit 40 includes a controller 52 that is communicatively coupled to the switch 42. The electronic circuit 40, along with the programmable chip package 50, may be mounted on or with respect to a substrate, such as a printed circuit board 54.

In one embodiment, the controller 52 is configured to control the switch 42 to decouple the main power source 44 from the programmable chip 48 prior to a sensitive operation, and to couple the alternate power source 46 to the programmable chip 48 during the sensitive operation. Subsequent to the sensitive operation, the controller 52 may control the switch 42 to couple the main power source 44 to the programmable chip 48.

As discussed above with regard to FIG. 3, in some embodiments the alternate power source 46 may be incapable of supplying sufficient power to the programmable chip 48 during the sensitive operation. Thus, during the sensitive operation, the controller 52 may monitor the power level of the alternate power source 46. Assume that the controller 52 makes a determination that the power level of the alternate power source 46 is at or below a threshold power level. Based on the determination, the controller 52 may control the programmable chip 48 to halt the sensitive operation. In one embodiment, the programmable chip 48 may be programmed to interface with the controller 52 and to control the programmable chip 48 to halt the sensitive operation. The controller 52 sends a signal to the programmable chip 48 directing the programmable chip 48 to halt the sensitive operation. Similar or identical to the process described above with regard to FIG. 4, in response to such signal, the programmable chip 48 may save the current context of the sensitive operation in a memory, for example (not illustrated). In another embodiment, to control the programmable chip 48 to halt the sensitive operation, the controller 52 may halt a clock 56 that drives the programmable chip 48. Thus, in this embodiment, the electronic circuit 40 may be used in conjunction with programmable chips 48 that have not been pre-programmed or pre-configured to operate in conjunction with the electronic circuit 40.

After the controller 52 controls the programmable chip 48 to halt the sensitive operation, the controller 52 controls the switch 42 to couple the main power source to the alternate power source 46 for recharging the alternate power source 46. After a period of time, the controller 52 determines that the alternate power source 46 is sufficiently recharged, by, for example, determining that the power level, such as a voltage level or current level, of the alternate power source 46 is at or above a threshold power level. In other embodiments, the controller 52 may wait a predetermined period of time to allow the alternate power source 46 to recharge.

The controller 52 then controls the switch 42 to decouple the main power source 44 from the alternate power source 46, and controls the programmable chip 48 to continue the sensitive operation. In one embodiment, wherein the programmable chip 48 is programmed to interface with the controller 52, to control the programmable chip 48 to continue the sensitive operation, the controller 52 sends a signal to the programmable chip 48 directing the programmable chip 48 to continue the sensitive operation. Similar or identical to the process described above with regard to FIG. 4, in response to such signal, the programmable chip 48 may recover the current context of the sensitive operation from the memory, and continue the sensitive operation. In other embodiments, to control the programmable chip 48 to continue the sensitive operation, the controller 52 may free the clock 56 that drives the programmable chip 48.

Figure 10:
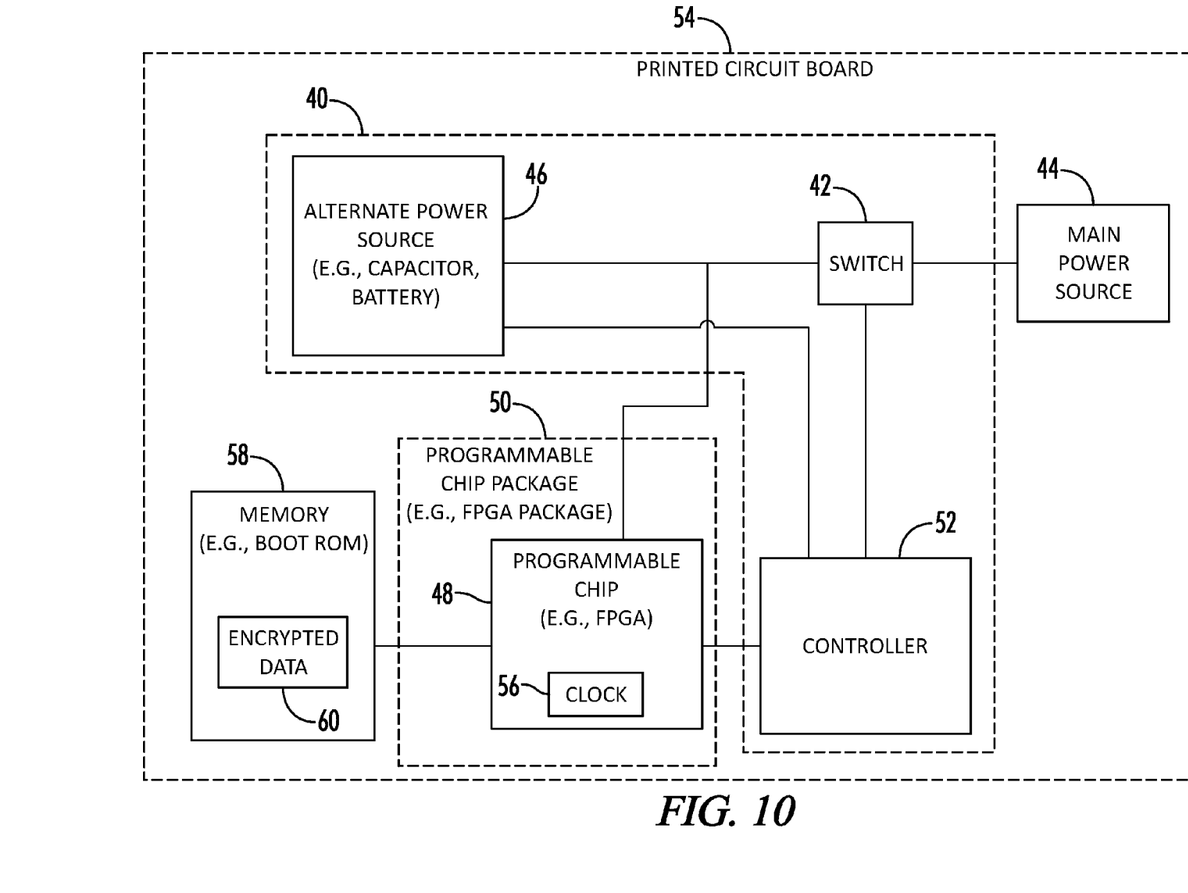
FIG. 10 is a block diagram illustrating an embodiment wherein the electronic circuit illustrated in FIG. 9 decouples the programmable chip during a decryption operation.

FIG. 10 is a block diagram illustrating an embodiment wherein the electronic circuit 40 illustrated in FIG. 9 decouples the programmable chip 48 during a sensitive operation that comprises a decryption operation. In this embodiment, the programmable chip 48 may be coupled to an external memory 58, such as, by way of non-limiting example, a boot ROM. The memory 58 contains encrypted data 60 which may comprise, for example, instructions for the programmable chip 48. Assume that a power on or reset of the programmable chip 48 occurs. Initially, the controller 52 may control the switch 42 to provide power to the programmable chip 48. In one embodiment, the programmable chip 48 and the controller 52 may initialize in a default sensitive operation state that indicates to the programmable chip 48 and the controller 52 that a power on or reset has occurred. The default sensitive operation state may indicate to the programmable chip 48 that the programmable chip 48 should wait until the receipt of a signal from the controller 52 before proceeding.

The controller 52 determines if a power level of the alternate power source 46, such as a voltage level or a current level, is at a threshold power level, such as a threshold voltage level, or a threshold current level. In one embodiment, upon power on or reset, the main power source 44 is electrically coupled to the alternate power source 46 and begins to charge the alternate power source 46. Once the alternate power source 46 is at the threshold power level, the controller 52 controls the switch 42 to decouple the main power source 44 from the programmable chip 48. The controller 52 may also signal the programmable chip 48 to begin the sensitive operation. The programmable chip 48 draws power from the alternate power source 46 and reads the encrypted data 60 from the memory 58. The programmable chip 48 decrypts the encrypted data 60, and loads the decrypted data. In one embodiment, the decrypted data may comprise instructions and other data that programs, or otherwise configures, the programmable chip 48 to perform a desired function. After the decryption operation completes, the controller 52 controls the switch 42 to couple the main power source 44 to the programmable chip 48.

Figure 11:
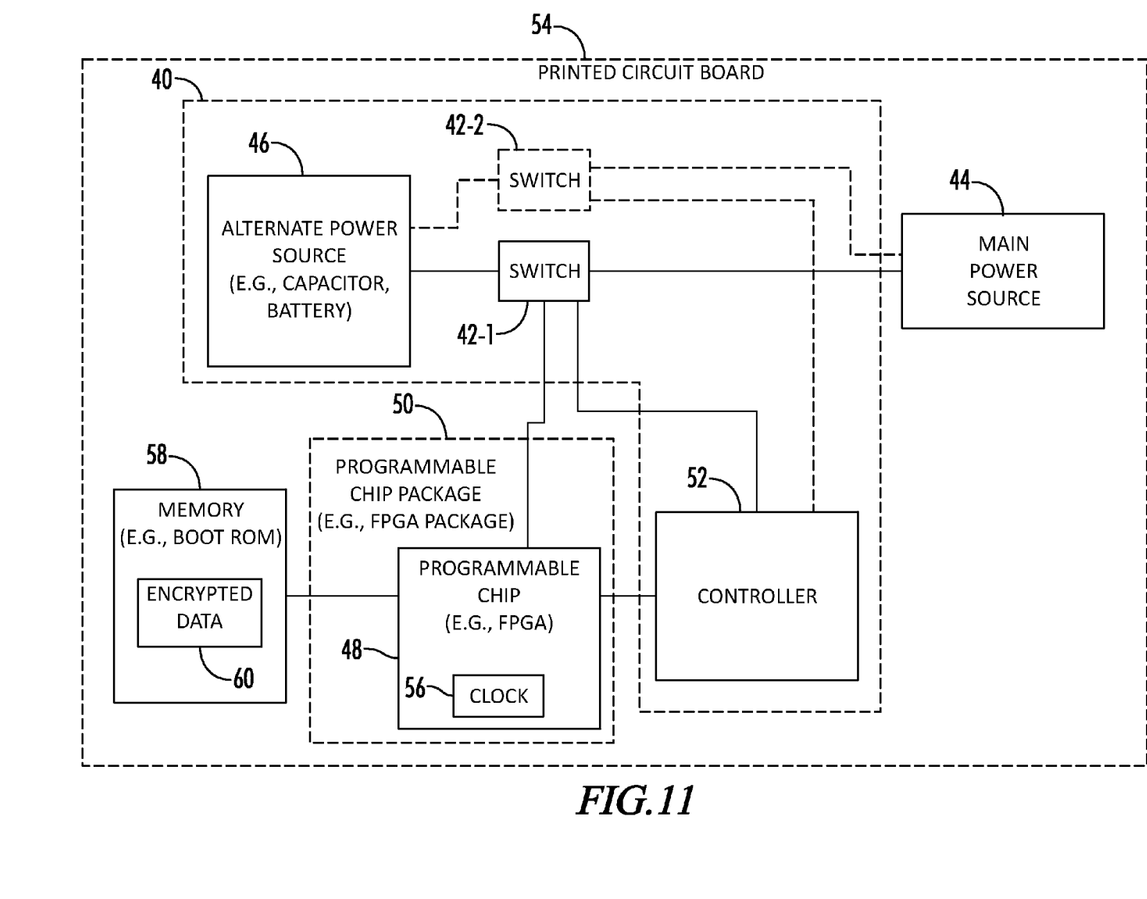
FIG. 11 is a block diagram illustrating another embodiment wherein multiple switches may be used to decouple or couple the main power source and the alternate power source to the programmable chip, or to one another.

FIG. 11 is a block diagram illustrating another embodiment wherein multiple switches may be used to decouple or couple the main power source and the alternate power source to the programmable chip, or to one another. In this embodiment, the controller 52 may control a switch 42-2 to couple the main power source 44 to the alternate power source 46 to allow the alternate power source 46 to recharge, and concurrently control a switch 42-1 to decouple both the main power source 44 and the alternate power source 46 from the programmable chip 48. Once charged, if performing a sensitive operation, the controller 52 may control the switch 42-2 to decouple the main power source 44 from the alternate power source 46, and concurrently control the switch 42-1 to decouple the main power source 44 from the programmable chip 48, while coupling the alternate power source 46 to the programmable chip 48. Once charged, if performing a sensitive operation, the controller 52 may control the switch 42-2 to decouple the main power source 44 from the alternate power source 46, and concurrently control the switch 42-1 to decouple the main power source 44 from the programmable chip 48, while coupling the alternate power source 46 to the programmable chip 48. After the sensitive operation is complete, the controller 52 may control the switch 42-1 to decouple the alternate power source 46 from the programmable chip 48 and couple the main power source 44 to the programmable chip 48. The controller 52 may control the switch 42-2 to couple the alternate power source 46 to the main power source 44 to recharge the alternate power source 46 in preparation for a subsequent sensitive operation. Such multiple switch embodiment may be utilized with any of the embodiments discussed herein, including those discussed with respect to FIGS. 1, 5, 8, 9, and 10.

Those skilled in the art will recognize improvements and modifications to the embodiments of the present disclosure. All such improvements and modifications are considered within the scope of the concepts disclosed herein and the claims that follow.

What is claimed is:

1. A programmable chip package comprising:
   a programmable chip configured to perform a sensitive operation;
   a switch configured to selectively couple a main power source to the programmable chip;
   an alternate power source; and
   a controller configured to:
      control the switch to decouple the main power source from the programmable chip prior to the sensitive operation, wherein the programmable chip is configured to draw power from the alternate power source during the sensitive operation; and
      control the switch to couple the main power source to the programmable chip after the sensitive operation.

2. The programmable chip package of claim 1, wherein the programmable chip is further configured to receive encrypted data from a memory external to the programmable chip package, and wherein the sensitive operation comprises a decryption operation.

3. The programmable chip package of claim 2, wherein the external memory comprises a boot read-only memory.

4. The programmable chip package of claim 1, wherein the alternate power source is capable of being coupled to the main power source via the switch, and the controller is further configured to:
   determine that a power level of the alternate power source is at or below a threshold power level;
   based on the determination:
      signal the programmable chip to halt the sensitive operation;
      control the switch to couple the main power source to the alternate power source for recharging the alternate power source;
      determine that the alternate power source is recharged;
      control the switch to decouple the main power source from the alternate power source; and
      signal the programmable chip to continue the sensitive operation.

5. The programmable chip package of claim 4, wherein the programmable chip is programmed to:
   receive the signal to halt the sensitive operation;
   save a current context of the sensitive operation;
   receive the signal to continue the sensitive operation;
   recover the current context of the sensitive operation; and
   continue the sensitive operation.

6. The programmable chip package of claim 4, wherein the power level is a voltage level.

7. The programmable chip package of claim 1, wherein the programmable chip comprises a field-programmable gate array.

8. The programmable chip package of claim 1, wherein the alternate power source comprises one of a capacitor and a battery.

9. The programmable chip package of claim 1, wherein the sensitive operation is initiated in response to a power on or reset of the programmable chip.

10. The programmable chip package of claim 1, wherein the programmable chip comprises the controller.

11. An electronic circuit comprising:
   at least one switch configured to selectively couple a main power source or an alternate power source to a programmable chip; and
   a controller communicatively coupled to the at least one switch, wherein the controller is configured to:
      control the switch to decouple the main power source from the programmable chip prior to a sensitive operation by the programmable chip and to couple the alternate power source to the programmable chip during the sensitive operation; and
      control the switch to couple the main power source to the programmable chip subsequent to the sensitive operation.

12. The electronic circuit of claim 11, wherein the sensitive operation comprises a decryption operation.

13. The electronic circuit of claim 11, wherein the controller is further configured to:
   determine that a power level of the alternate power source is at or below a threshold power level; and
   based on the determination:
      control the programmable chip to halt the sensitive operation;
      control the switch to couple the main power source to the alternate power source for recharging the alternate power source;
      determine that the alternate power source is recharged;
      control the switch to decouple the main power source from the alternate power source; and
      control the programmable chip to continue the sensitive operation.

14. The electronic circuit of claim 13, wherein the power level comprises a voltage level of the alternate power source and the threshold power level comprises a threshold voltage level.

15. The electronic circuit of claim 13, wherein to control the programmable chip to halt the sensitive operation, the controller halts a clock that drives the programmable chip.

16. The electronic circuit of claim 15, wherein to control the programmable chip to continue the sensitive operation, the controller frees the clock that drives the programmable chip.

17. The electronic circuit of claim 13, wherein to control the programmable chip to halt the sensitive operation, the controller sends a signal to the programmable chip directing the programmable chip to halt the sensitive operation.

18. The electronic circuit of claim 17, wherein to control the programmable chip to continue the sensitive operation, the controller sends a signal to the programmable chip directing the programmable chip to continue the sensitive operation.

19. The electronic circuit of claim 11, wherein the alternate power source comprises one of a capacitor and a battery.

20. A method for eliminating a power signature, comprising:
   providing power through a switch from a main power source to a programmable chip configured to perform a sensitive operation;
   controlling the switch to decouple the main power source from the programmable chip prior to the sensitive operation, wherein the programmable chip is configured to draw power from an alternate power source during the sensitive operation; and
   controlling the switch to couple the main power source to the programmable chip after the sensitive operation.

21. The method of claim 20, further comprising:
   making a determination that a power level of the alternate power source is at or below a threshold power level; and
   based on the determination:
      controlling the programmable chip to halt the sensitive operation;
      controlling the switch to couple the main power source to the alternate power source for recharging the alternate power source;
      determining that the alternate power source is recharged;
      controlling the switch to decouple the main power source from the alternate power source; and
      controlling the programmable chip to continue the sensitive operation.

* * * * *